No. 815,437. PATENTED MAR. 20, 1906.
L. J. KNOX.
TOPPING ATTACHMENT FOR HARVESTERS.
APPLICATION FILED APR. 12, 1905.
3 SHEETS—SHEET 1.
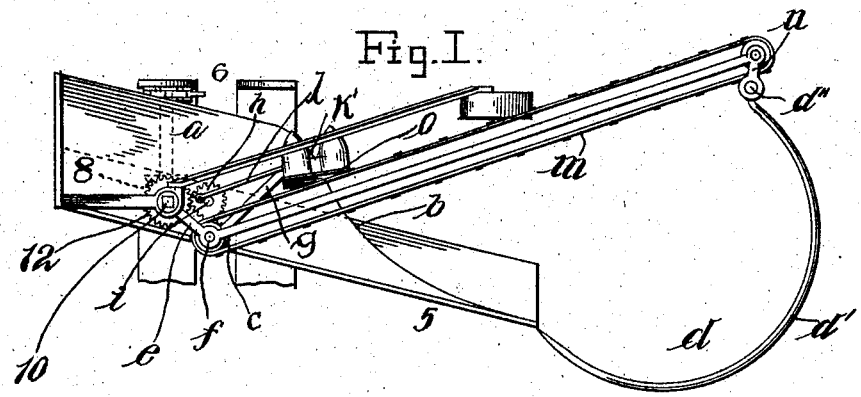
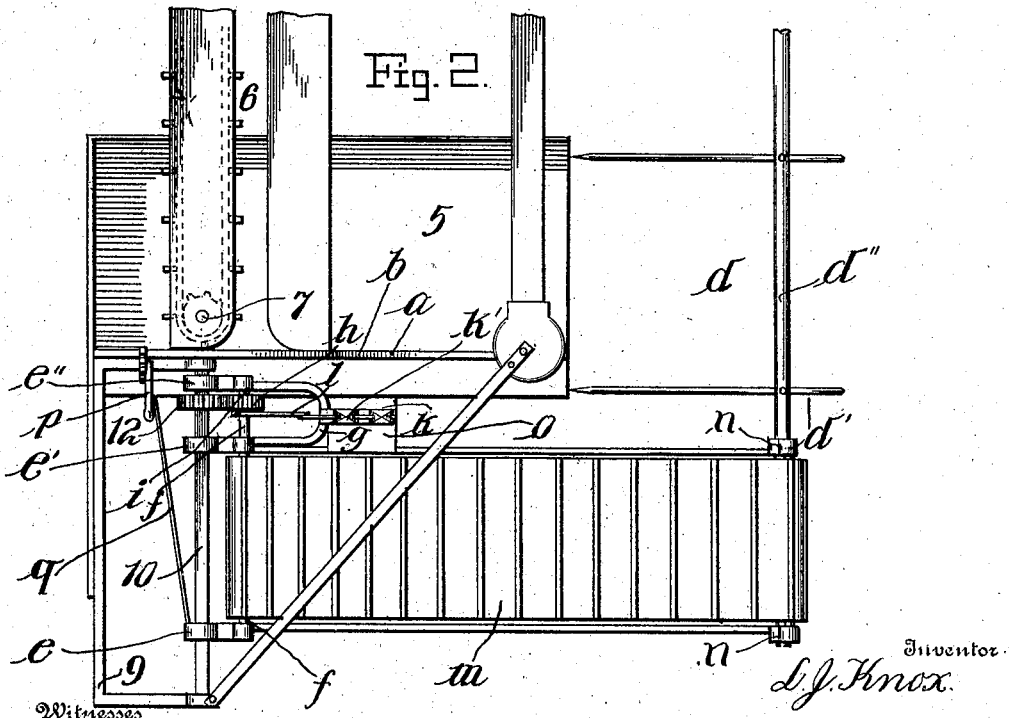
Inventor
L. J. Knox
Witnesses No. 815,437. PATENTED MAR. 20, 1906.
L. J. KNOX.
TOPPING ATTACHMENT FOR HARVESTERS.
APPLICATION FILED APR. 12, 1905.
3 SHEETS—SHEET 2.
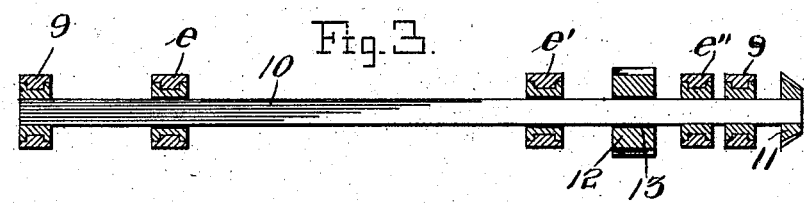
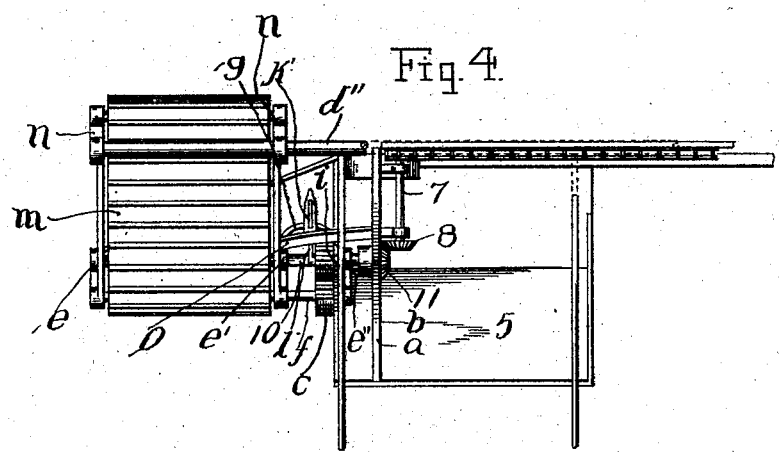

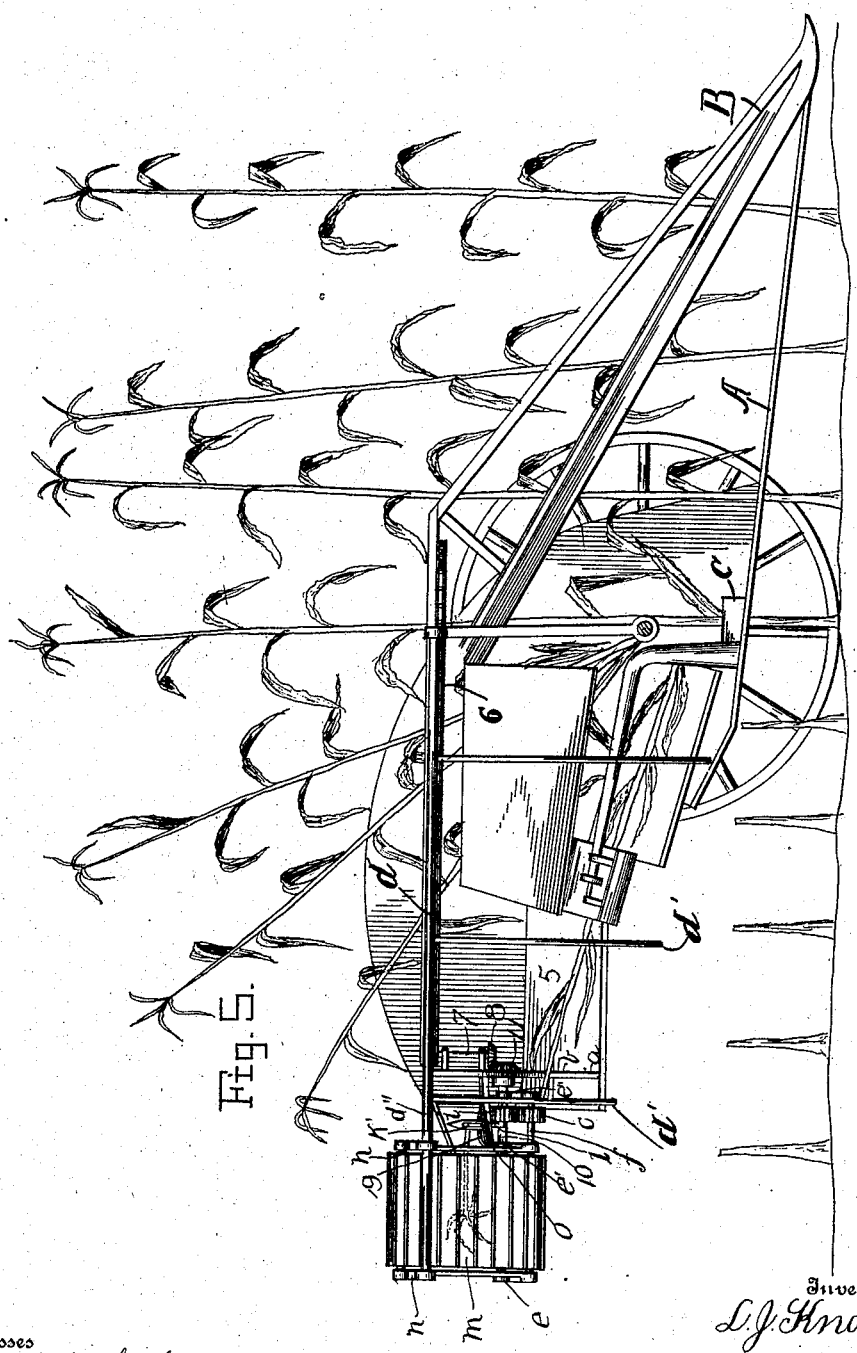

UNITED STATES PATENT OFFICE.

LEVI J. KNOX, OF NOWATA, INDIAN TERRITORY.

TOPPING ATTACHMENT FOR HARVESTERS.

No. 815,437.　　　Specification of Letters Patent.　　Patented March 20, 1906.

Application filed April 12, 1905. Serial No. 255,205.

*To all whom it may concern:*

Be it known that I, LEVI J. KNOX, a citizen of the United States, residing at Nowata, Cherokee Nation, Indian Territory, have invented certain new and useful Improvements in Topping Attachments for Harvesters; and I do hereby declare the following to be a full, clear, and exact description of the invention, such as will enable others skilled in the art to which it appertains to make and use the same.

This invention relates to harvesters, and more particularly to attachments therefor, and has for its object to provide an attachment by means of which harvested grain may be topped before leaving the harvester.

A particular object is to provide a machine especially adapted for harvesting corn.

Other objects and advantages will be apparent from the following description, and it will be understood that modifications of the specific construction shown may be made and any suitable materials may be used for the various parts without departing from the spirit of the invention.

In the drawings forming a portion of this specification, and in which like numerals and letters of reference indicate similar parts in the several views, Figure 1 is an elevation of a harvester provided with the present invention. Fig. 2 is a view showing a portion of the harvester and illustrating the present invention in top plan. Fig. 3 is a sectional view showing the mounting of the movable gear upon the shaft. Fig. 4 is an end view of the present invention. Fig. 5 is a side elevation, partly in section, of a harvester provided with the present invention.

Referring now to the drawings, there is shown a harvester 5, including a grain-carrier 6, which is driven by a shaft 7, the latter carrying a gear-wheel 8. In the operation of the harvester the carrier 6 receives the harvested grain and moves the latter rearwardly. At the rearward end of the carrier there is a vertically-disposed board $a$, which has a downwardly-slanting edge $b$, and this board is arranged to receive the stalks of grain upon its upper edge, the weight of the grain carrying it down the slanting portion $b$ of this edge into a bundle-former $d$. As will be readily understood, the grain when falling upon the board $a$ lies with the head portions of its stalks extending rearwardly beyond this board.

The present attachment comprises a frame 9, which is attached to the harvester and which has a shaft 10, angular in cross-section, revolubly mounted at its ends therein. This shaft carries a gear 11, which is meshed with the gear 8, the two shafts 7 and 10 being thus arranged for simultaneous rotation, and mounted slidably upon the shaft 10 there is a gear 12, having an angular opening 13 therethrough, in which the shaft is snugly engaged.

Brackets $e$, $e'$, and $e''$ are slidably engaged with the shaft 10 and are also arranged for rotation of this shaft therein, and these brackets have a shaft $f$ revolubly mounted therein, which carries a gear $c$, and this gear $c$ is meshed with a gear $h$, which is mounted upon a stub-shaft $i$, the latter being carried by the innermost bracket, which is the bracket $e''$.

A yoke $g$ is carried by the bracket $e''$ and the bracket $e'$, the latter lying adjacent to the former, and this yoke has a finger-bar $k$ secured thereto, the two fingers $k'$ of which are directed upwardly, and this finger-bar is disposed to receive the stalks of grain between its fingers as these stalks pass downwardly over the edge $b$ of the board $a$. A pitman $l$ connects the gear $h$ with the knife K of the finger-bar $k$ for operation of the knife when the gear is rotated to cause the knife to traverse the space between the fingers $k'$.

The shaft $f$ is arranged to drive an endless carrier $m$, which is located at the opposite side of the finger-bar from the harvester, and this carrier is arranged to discharge matter falling thereupon at one side of the harvester.

The bundle-former $d$ of the harvester consists of a plurality of arms $d'$, which are carried by a shaft $d''$, and the outer end of the carrier $m$ is mounted in brackets $n$, which are engaged with this shaft.

A plate $o$ extends beneath the finger-bar $k$ and projects over the carrier $m$.

In operation as the stalks of grain pass downwardly over the board $a$ they enter the finger-bar $k$, which is operated to cut the tops from the grain, these tops falling upon the plate $o$ and passing therefrom to the carrier $m$. As will be observed, the carrier and finger-bar are movable toward and away from the board $a$ to permit of adjustment to suit stalks of different lengths, and a hand-lever $p$ is mounted upon the frame 9 and is connected with these movable portions by means of a rod $q$ for movement of these portions when the hand-lever is operated. It will of course be understood that the brackets n are slidable upon the shaft d''.

In Fig. 5 there is shown a harvester including a frame A, having a forwardly-extending stalk-guide B, and in it is mounted a stalk-cutting mechanism C. The carrier 6 is located at the upper portion of the harvester and in position to engage the stalks cut by the mechanism C to move the upper portions thereof rearwardly, and these stalks fall upon the board a and pass down the curved upper edge of the latter into the finger-bar k.

What is claimed is—

1. The combination with a harvester, including a cutting mechanism and a vertically-disposed downwardly-slanted board arranged to receive grain upon its upper edge from the cutting mechanism, of a pair of spaced fingers disposed adjacent to the guide and in position to receive therebetween grain passing downwardly over the guide, a knife arranged to traverse the space between the fingers, and means for operating the knife, said fingers and knife being movable toward and away from the grain-receiving board.

2. The combination with a downwardly-slanting grain-guide, of spaced fingers arranged to receive therebetween grain passing over the guide, a knife arranged to traverse the space between the fingers, means for operating the knife, a carrier located at the opposite side of the fingers from the guide and arranged to receive portions of grain cut by the knife, said fingers, knife and carrier, being movable toward and away from the guide, and means for operating the carrier.

3. The combination with a harvester including a grain-carrier and a guide arranged for the reception of grain from the carrier and adapted for the passage of said grain downwardly thereover, of a frame connected with the carrier, a shaft revolubly connected in the frame, connections between said shaft and the operating mechanism of the harvester for operation of the former by the latter, a gear carried by the shaft and slidable thereon, brackets slidably mounted upon the shaft, a cutter-bar connected with certain of said brackets, said cutter-bar being adapted to receive grain passing downwardly over the guide, a gear mounted upon one of the brackets and meshing with the first-named gear, connections between the second-named gear and the cutter-bar for operation of the latter, a carrier connected with the brackets for movement therewith and disposed to receive matter from the cutter-bar and connections between the carrier and the shaft for operation of the former by the latter said brackets and first-named gear being movable toward and away from the guide.

In testimony whereof I affix my signature in presence of two witnesses.

LEVI J. KNOX.

Witnesses:
   E. B. LAMSON,
   J. E. CAMPBELL.